No. 704,370. Patented July 8, 1902.
H. F. PURSER.
PHOTOGRAPHIC CAMERA.
(Application filed Apr. 24, 1902.)
(No Model.)
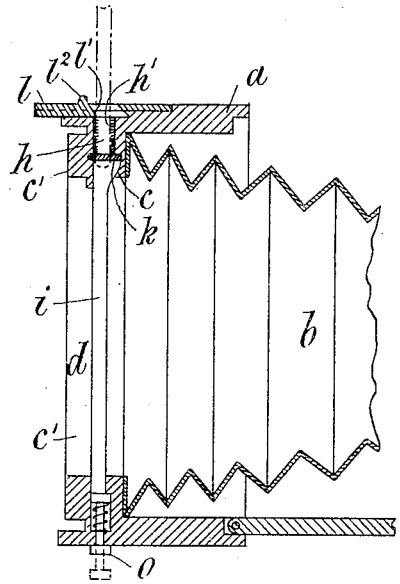
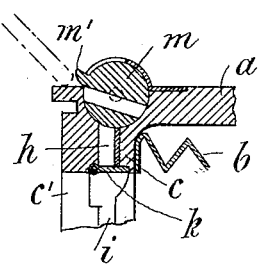
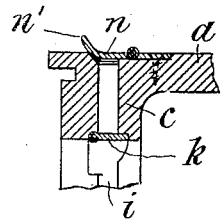
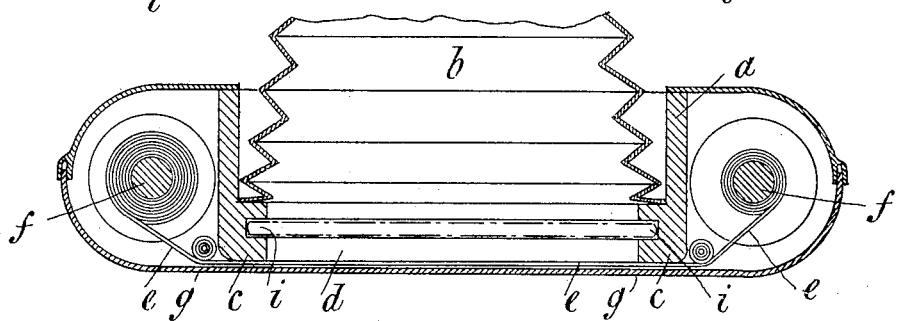
Witnesses: Inventor
Henry F. Purser
By
James L. Norris.
Atty.
THE NORRIS PETERS CO., PHOTO-LITHO., WASHINGTON, D. C.

UNITED STATES PATENT OFFICE.

HENRY F. PURSER, OF LONDON, ENGLAND.

PHOTOGRAPHIC CAMERA.

SPECIFICATION forming part of Letters Patent No. 704,370, dated July 8, 1902.

Application filed April 24, 1902. Serial No. 104,534. (No model.)

*To all whom it may concern:*

Be it known that I, HENRY FRANK PURSER, a subject of the King of Great Britain, residing at 31 Hatton Garden, in the city of London, England, have invented certain new and useful Improvements in Photographic Cameras, of which the following is a specification.

My invention relates to that description of photographic camera which is provided with fittings for roll-films—such, for instance, as the kodak type.

An objection to all roll-film cameras is the fact that when it is only desired to make a single exposure and to immediately develop same it is necessary either to remove the roll of film from the camera (or to roll the same completely upon its spool) before fitting a plate-holder to the opening at the back of the camera or to waste a number of unexposed sections of said film.

The object of my invention is to provide means whereby a plate-holder may be inserted for exposing a plate or cut film and removed from the camera without removing or in any way disturbing or displacing the roll-film.

According to my invention I interpose the plate-holder which carries the plate or cut film between the lens and the roll-film and preferably near to that portion of the film which is stretched across the back frame between the spools. The plate-holder when inserted in the camera in front of the roll-film is so arranged as to completely shut off from the latter the rays of light entering by the lens.

In order that my said invention may be particularly described and ascertained, reference is hereby made to the accompanying drawings, in which similar letters of reference indicate corresponding parts. Said drawings illustrate the application of my invention to a roll-film camera of the pocket-folding type, from which its application to other roll-film cameras or fittings for same will be readily understood.

Figure 1 is a sectional elevation, and Fig. 2 a sectional plan, of so much of a roll-film camera as is necessary for the purposes of this description. Figs. 3 and 4 are detail views.

$a$ is the camera-case; $b$, the bellows; $c$, the rectangular back frame to which the bellows are secured; $d$, the rectangular opening in said back frame past which the film $e$ is moved intermittently as required, the rear surface $c'$ of the frame $c$ corresponding with the focal plane or register of the lens. $ff$ are the rollers or spools which accommodate the film. $g$ is the detachable opaque backboard. All the above are as usually constructed in this type of camera, except so far as the particular construction of the back frame $c$ is concerned, as hereinafter described.

As shown, a slot or opening $h$ is formed through the casing $a$, and the back frame $c$ is made sufficiently deep or is otherwise constructed to allow a groove $i$ or its equivalent to be located therein, the groove or its equivalent extending along the two opposite sides and along the side opposite to the slot $h$, as shown. The slot $h$ is provided with a velvet, plush, rubber, or equivalent lining, as at $h'$, and a spring-controlled hinged or pivoted light-trap $k$ or other self-acting flap which will effectually prevent light passing through said slot $h$ into the camera. I fit a movable cover-plate $l$ to the slot, as shown in Fig. 1, which is capable of sliding in and out across the slot, a suitable spring being provided to automatically return the plate to its normal position, so as to close the opening $h$. Any other suitable device may be employed in substitution for the plate $l$—such as the slotted and pivoted roller $m$, Fig. 3, or the hinged plate $n$, Fig. 4—the object of the cover-plate or its equivalent device being to prevent access of dust or dirt to the slot $h$ when the plate-holder is not in use and incidentally to further assist in keeping out the light should the light-trap $k$ fail to act properly. The cover-plate or equivalent device may also be adapted to engage the plate-holder, so as to hold the same in position during the time the sliding shutter is being withdrawn ready to expose the plate or cut film. For instance, in Fig. 1 the chamfered edge $l'$ will or can when the plate-holder is completely inserted, leaving only the finger-piece of the sliding shutter projecting, be forced by its spring or otherwise over the top edge of the plate-holder. Similarly spring-catches will serve a like purpose.

$o$ is a push-pin for starting the plate-holder out of the case. The pin may be fitted with a spring, as shown, to assist this movement automatically on disengaging the chamfered edge $l'$ or the catches from contact with the plate-holder.

Preferably the cover-plate or its equivalent is adapted to be displaced from the slot $h$ by using the lower edge of the plate-holder. Thus in Figs. 1 and 4 the lower edge of the plate-holder is thrust against the projection $l^2$ $n'$, respectively, to open the slot, and in Fig. 3 the lower edge of the plate-holder is thrust against the lip or projection $m'$, thereby causing the slotted roller $m$ to partially revolve on its pivots or in bearings, so as to bring the slot into which the slide passes into coincidence with the slot $h$.

It will be understood that in cameras—such as the ordinary rack-out, stand, and box cameras—which are fitted for roll-films the plate-holder may be introduced between the lens and the roll-film at a point just beyond the spools, the latter being preferably arranged at the ends of and tangentially to the back frame. It will also be understood that the plate-holder must take up a position parallel with the rear surface $c'$ of the frame $c$. Similarly, the plate-holder being in front of the roll-film it will be necessary to move the lens and front forward a corresponding distance to compensate for the alteration of focus.

I claim—

1. Means for fitting a plate-holder to roll-film holders and roll-film cameras, consisting of a case provided with a slot communicating with the interior thereof; means in continuation of said slot whereby the plate-holder is guided to and located in a position parallel with and immediately in front of a film without displacing the latter, said means being adapted, in conjunction with the plate-holder, to exclude light from said film; and means for rendering said slot light-proof, substantially as set forth.

2. In roll-film holders and cameras, the combination of the case provided with a slot; a plate-holder adapted to pass through said slot; a back frame adapted to locate and retain the plate-holder in a parallel position immediately in front of a film and so as to exclude light therefrom; and means for rendering the slot light-proof, substantially as set forth.

3. The combination with roll-film holders and cameras, of the case thereof provided with a slot; a plate-holder approximately fitting said slot; a back frame provided with grooves formed in continuation of said slot; a self-closing light-trap at the inner end of said slot; and means for excluding dirt and dust from said slot and assisting to exclude light, substantially as set forth.

4. In a camera, the combination with roll-film holders and the case thereof provided with a slot, the back frame thereof provided with grooves, said slot and groove adapted to receive a plate-holder in front of the film without displacing the same, of a sliding cover adapted to be moved across said slot in the case, and means to render said cover self-closing, substantially as described.

5. In a camera, the combination with the case thereof provided with a slot and a back frame provided with grooves, said slot and grooves adapted to receive a plate-holder, of a push-pin suitably connected with the case and adapted to assist in removing the plate-holder therefrom.

6. In a camera, the combination with the case thereof provided with a slot and the back frame provided with grooves registering with the slot, said slot and grooves adapted to receive a plate-holder, of means for closing the inner end of said slot to prevent light passing through said slot into the camera, and means for closing the outer end of said slot.

In testimony whereof I have hereunto set my hand in presence of two subscribing witnesses.

HENRY F. PURSER.

Witnesses:
GEORGE C. DOWNING,
WALTER J. SKERTEN.